United States Patent [19]

Reed

[11] Patent Number: 5,058,681

[45] Date of Patent: Oct. 22, 1991

[54] METHOD OF IMPROVING PREMEABILITY OF FINES-CONTAINING HYDROCARBON FORMATIONS BY STEAM INJECTION

[75] Inventor: Marion G. Reed, Hacienda Heights, Calif.

[73] Assignee: Chevron Research and Technology Company, San Francisco, Calif.

[21] Appl. No.: 582,449

[22] Filed: Sep. 13, 1990

Related U.S. Application Data

[63] Continuation-in-part of Ser. No. 453,652, Dec. 20, 1989.

[51] Int. Cl.$^5$ .............................................. E21B 43/24
[52] U.S. Cl. ................................................. 166/303
[58] Field of Search ........................... 166/272, 303, 902

[56] References Cited

U.S. PATENT DOCUMENTS

| | | | |
|---|---|---|---|
| 4,475,595 | 10/1984 | Watkins et al. | 166/303 |
| 4,549,609 | 10/1985 | Watkins et al. | 166/303 |
| 4,572,296 | 2/1986 | Watkins | 166/303 |
| 4,574,886 | 3/1986 | Hopkins et al. | 166/303 X |
| 4,714,112 | 12/1987 | Nigrini et al. | 166/272 X |
| 4,719,972 | 1/1988 | Hsueh | 166/272 X |
| 4,903,769 | 2/1990 | Hsueh et al. | 166/272 |
| 4,913,236 | 4/1990 | Reed | 166/272 X |

*Primary Examiner*—George A. Suchfield
*Attorney, Agent, or Firm*—Edward J. Keeling; Ernest A. Schaal

[57] ABSTRACT

A method is disclosed for improving the effectiveness of fluid transport in a fines-containing earthen formation and inhibiting permeability damage of that formation. Wet steam is generated from a feedwater that contains potassium chloride, enough anhydrous ammonia is added into the steam to produce sufficient ammonium ions in the vapor phase condensate to inhibit permeability damage of the formation in the vicinity of the vapor phase, enough carbon dioxide is added into the steam effective to the pH of the vapor phase condensate between 7.5 and 10.5, the wet steam is injected into the formation, and then the steam is blown down to vaporize liquid water of the formation and cause the vaporized water to leave the portion.

6 Claims, 3 Drawing Sheets

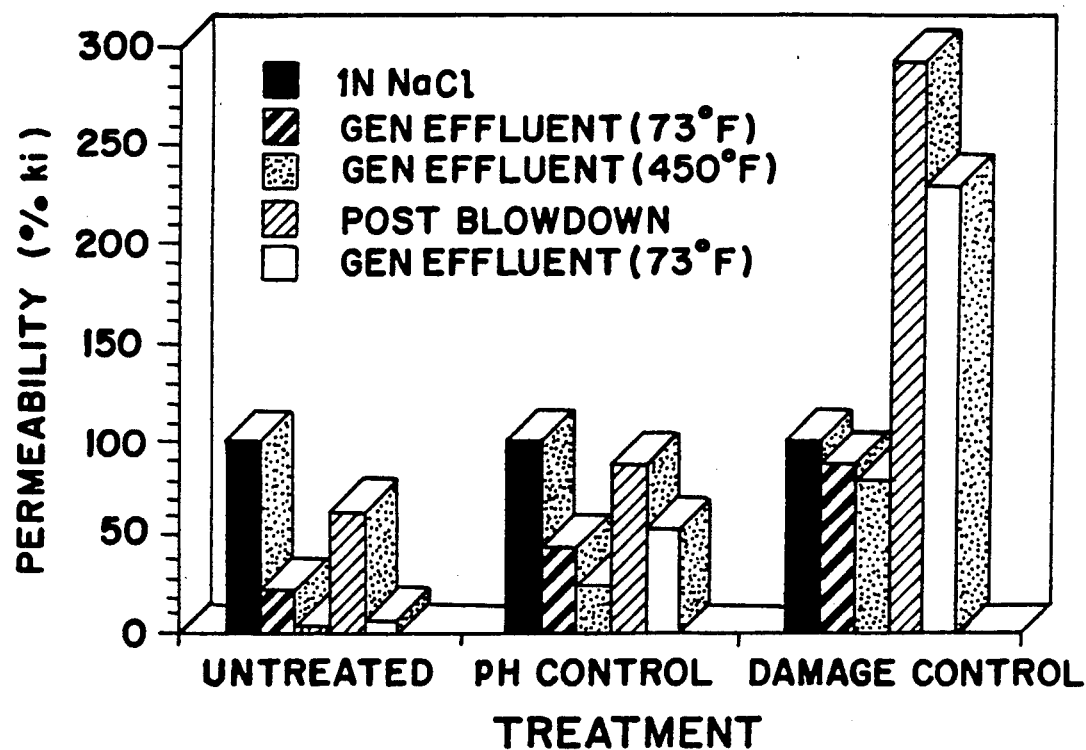
FIG_1
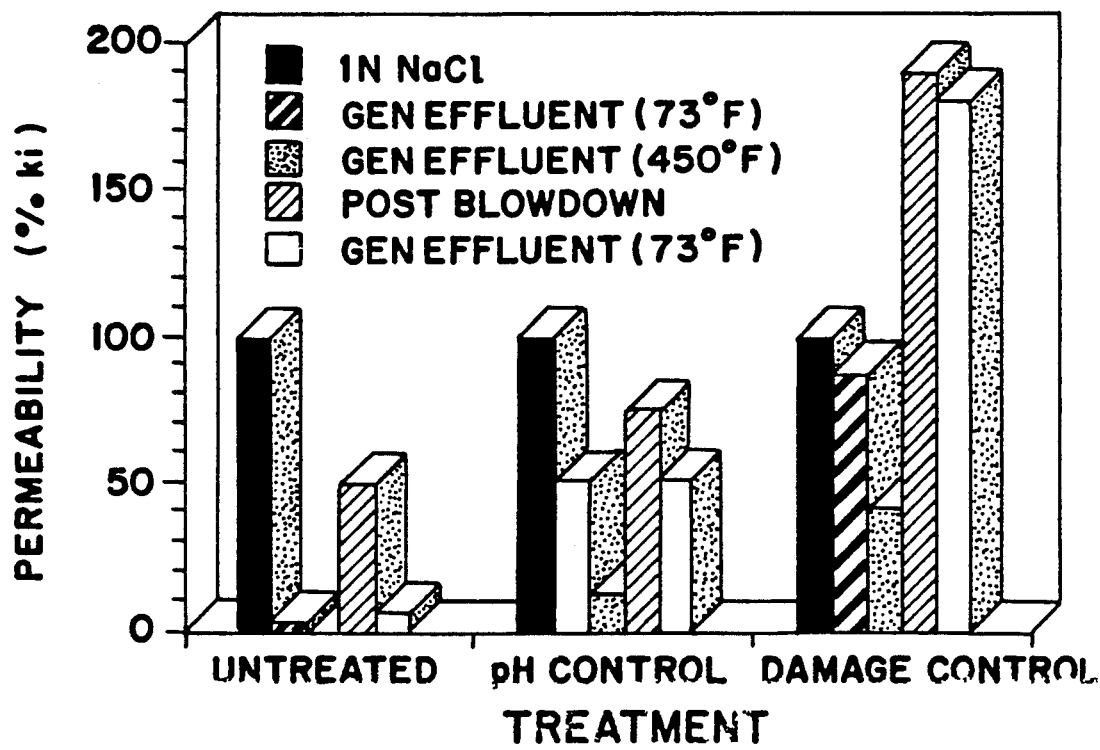
FIG_2

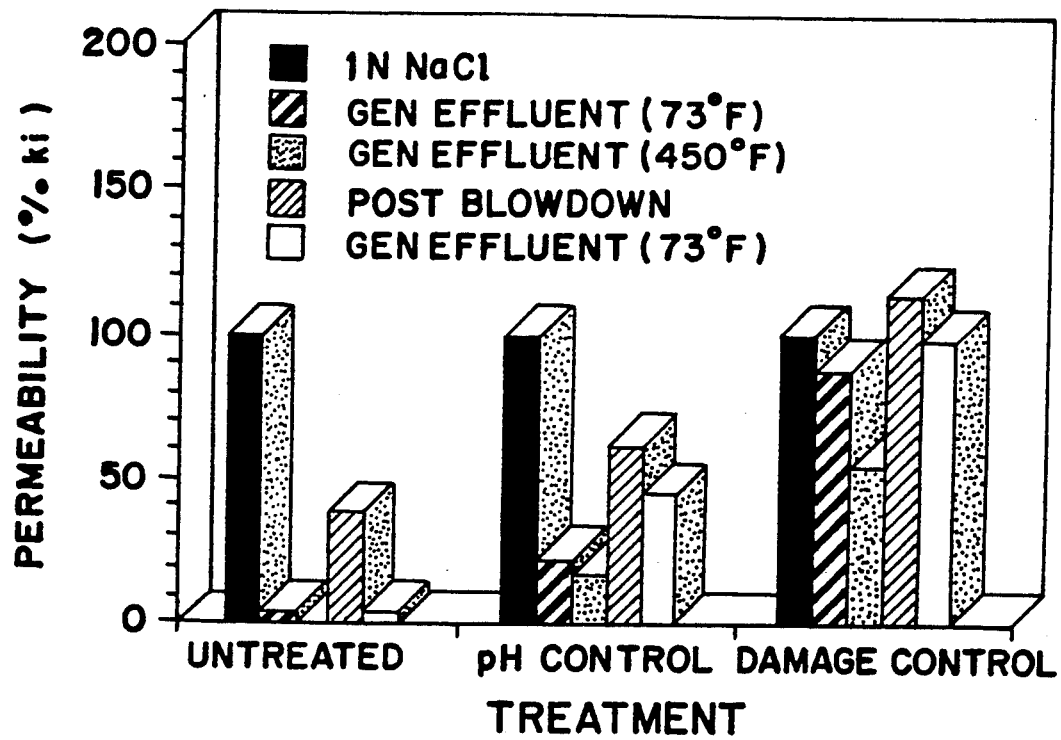
FIG_3
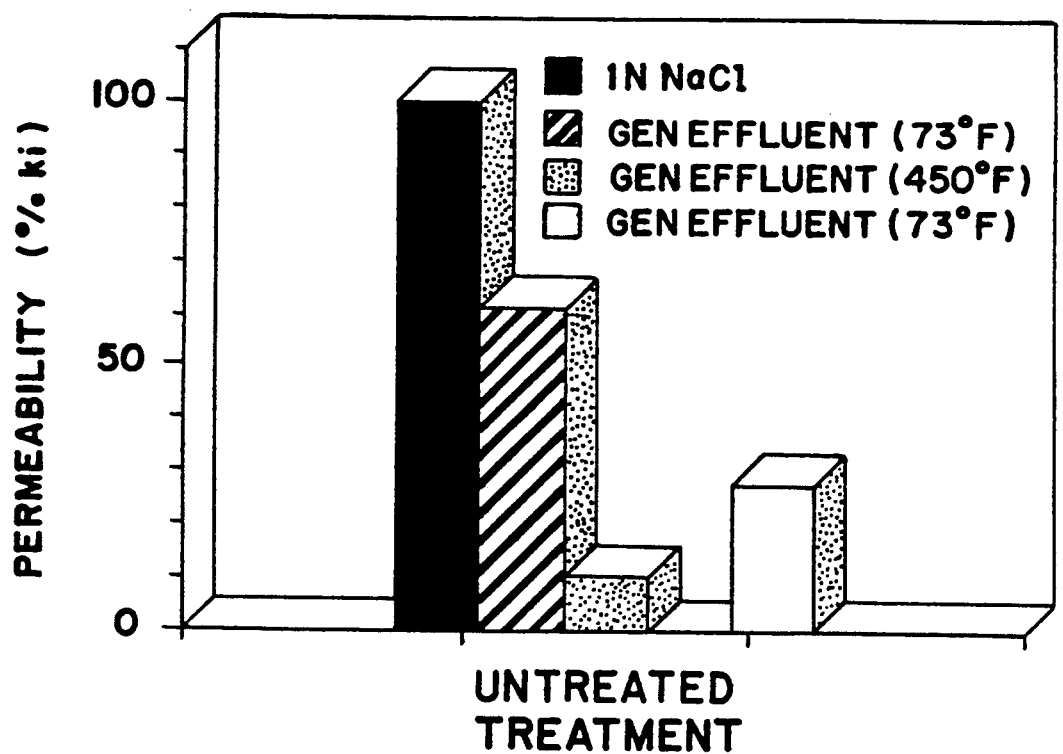
FIG_4

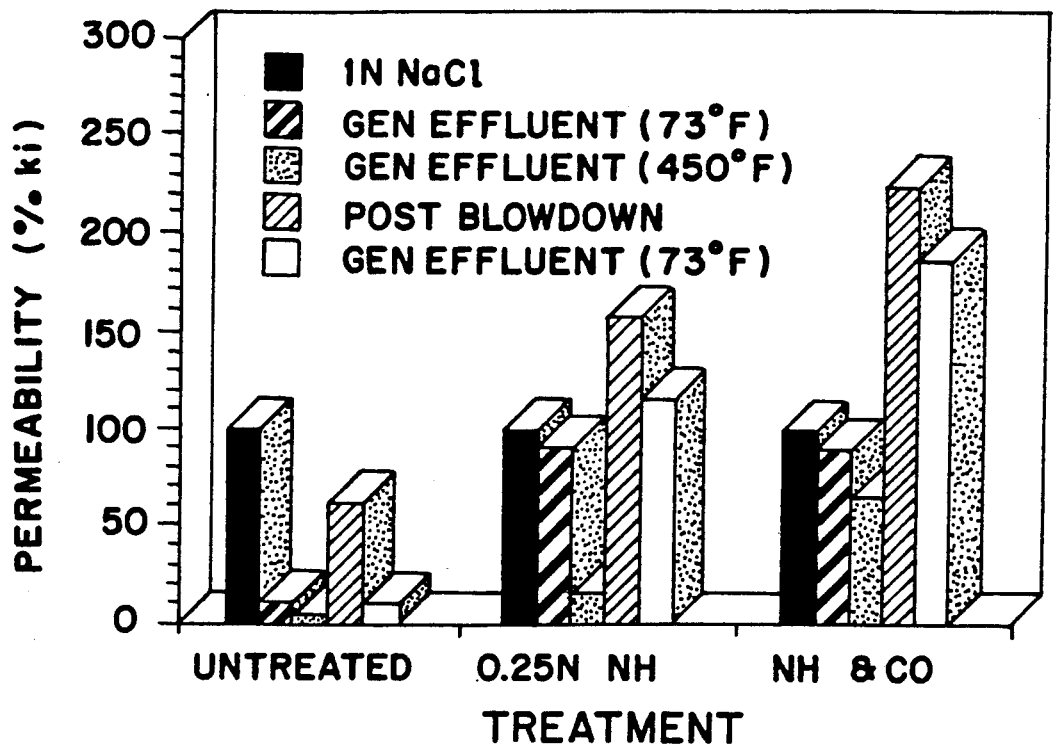
FIG_5
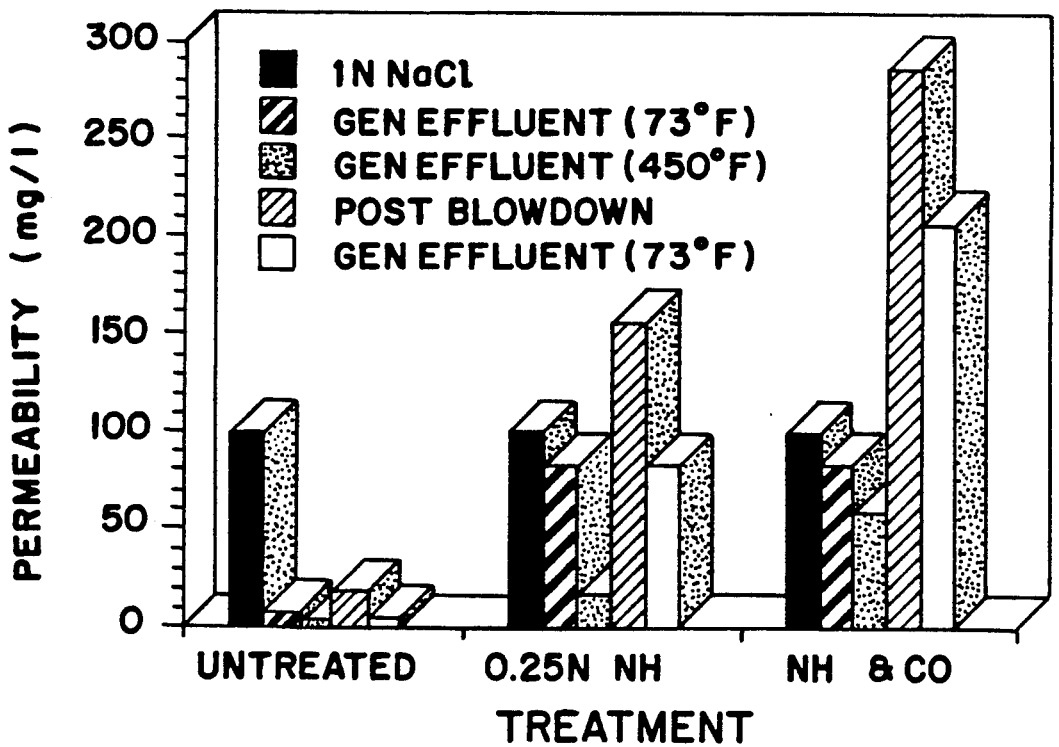
FIG_6

METHOD OF IMPROVING PREMEABILITY OF FINES-CONTAINING HYDROCARBON FORMATIONS BY STEAM INJECTION

CROSS-REFERENCE TO RELATED APPLICATIONS

This is a continuation-in-part of application Ser. No. 453,652, filed Dec. 20, 1989, entitled "Improving Permeability of Fines-Containing Earthen Formations By Removing Liquid Water."

The present invention relates to a method for improving permeability of a hydrocarbon formation containing clay minerals while inhibiting permeability damage of that formation. Furthermore, the present invention relates to a method for simultaneously (1) improving permeability of a hydrocarbon-containing formation which contains clay minerals; (2) preventing permeability damage to that formation; and (3) improving the injectivity of steam into that formation.

BACKGROUND OF THE INVENTION

Steam injection techniques, such as steam stimulation and steam flooding, have been used to recover immobile heavy oils and to enhance the oil recovery from older wells where the natural field pressures are too low for unassisted production. They are designed to reduce the reservoir flow resistance by reducing the viscosity of the crude.

These techniques involve injection into the well of a high temperature wet steam in cycles of thousands of cubic meters at a time. Wet steam is a mixture of water vapor and varying amount of hot liquid water, the quality of wet steam generally ranging from 35% to 80%. Because of the density difference between the two phases of the wet steam, the vapor phase preferentially enters the upper part of the well's injection interval and the liquid phase preferentially enters the lower part.

Associated with using these wet steams is the problem of permeability damage of hydrocarbon formations containing clay minerals. "Clay mineral" is a general term for minerals such as kaolinite, illite, chlorite, smectite, and mixtures thereof. Most of these minerals have a very distinctive, book-like structure made of pages of thin layers of hydrous aluminosilicates. During steam injection, the reaction of fresh water and some clay minerals behaves much like a soaking wet book: they swell, ripple, and break off. Some clay minerals swell to 600% to 1000% of their initial volume when subjected to fresh water during steam injection. This results in (1) reducing pore volume for fluid flow and (2) plugging pore channels from fines migration. The swelling of clay and the migration of clay fines severely inhibit steam injectivity into the formation. Formations that contain clay minerals are susceptible to fresh water injection that cause the clay to disperse and migrate. When fines move downstream, they tend to bridge in pore constrictions to form miniature filter-cakes throughout the pore network. This can decrease steam injectivity in the lower interval where liquid water is injected and also in the upper injection interval where vapor phase condensation takes place. In some cases, clay structural expansion may contribute to this decrease in permeability.

It is well known that clay minerals expand greatly when the interlayers are occupied by sodium ions. A sodium ion can absorb twelve or more irregularly oriented water molecules. If the interlayer sodium ions are replaced with ammonium or potassium ions, the swelling problem may be substantially reduced.

Ammonium salts have been used to control the pH of wet steam and decrease silica dissolution. But for a high-clay-content reservoir, the concentration of ammonium ions sufficient to remedy the silica dissolution problem is usually inadequate to reduce permeability damage produced by clay minerals.

U.S. Pat. No. 4,549,609 by Watkins et al, filed Aug. 15, 1984, which is hereby incorporated by reference, attempts to solve this problem. It teaches injecting an ammoniacal nitrogen-containing compound into the wet steam to reduce permeability damage caused by silica dissolution. But this patent fails to address another problem associated with ammonium salt treatment.

To treat a high-clay reservoir for preventing permeability damage caused by clay minerals, relatively large amounts of ammonium salts must be added to the steam. Much higher concentrations of ammonium ions are required to treat a clayey formation to prevent permeability damage by clay minerals than to treat a steam to reduce permeability damage by silica dissolution. These large additions of ammonium ions to feedwater can create serious problems caused by acidity generated by decomposition of the ammonium ions in the steam generator. In Watkin's process, the pH of the generator effluent residual liquid phase is monitored to determine if the process is being properly applied. On the other hand, in our process, the ammonium ion concentrations in the vapor condensate is principally monitored and the residual liquid phase pH is secondarily monitored. Accordingly, the need exists for a further improved steam injection treatment which simultaneously (1) prevents permeability damage to a hydrocarbon-containing formation which contains clay minerals, and (2) improving the steam injection rate into the formation. It is the principle object of this invention to provide such a method.

SUMMARY OF THE INVENTION

The present invention provides a method for improving the effectiveness of fluid transport in a fines-containing earthen formation while inhibiting permeability damage of that formation. The effectiveness of fluid transport is increased by increasing the permeability of a portion of the formation by removing liquid water from that portion. Permeability damage caused by clay minerals is inhibited by injecting into the formation a wet steam that has, in its vapor phase, ammonia and carbon dioxide.

Enough ammonia should be present in the vapor phase to produce sufficient ammonium ions in the condensate of that vapor phase to inhibit permeability damage of the formation contacted by the vapor phase. Enough carbon dioxide should be present in the vapor phase to keep the pH of the vapor phase condensate between 7.5 and 10.5. Potassium chloride may also be present in the wet steam, to inhibit permeability damage of the formation contacted by the residual liquid phase of the wet steam. Once injected, the wet steam is blown down to vaporize substantially all of the liquid water within the formation and to cause the vaporized water to leave the portion.

In one embodiment, potassium chloride is added to a feedwater, wet steam is generated from that feedwater, enough anhydrous ammonia is added into the wet steam sufficient to produce a concentration of ammonium ions in the vapor phase condensate of the wet steam effective to inhibit permeability damage of the formation contacted by the vapor phase, enough carbon dioxide is added into the wet steam effective to keep the pH of the vapor phase condensate between 7.5 and 10.5, and the resulting wet steam is injected into the formation.

In an alternate embodiment, dry steam is injected into a well within the formation. That dry steam has enough ammonia to produce a concentration of ammonium ions in the steam condensate effective to inhibit permeability damage of the formation contacted by the steam, and enough carbon dioxide in the dry steam to keep the pH of the steam condensate between 7.5 and 10.5.

BRIEF DESCRIPTION OF THE DRAWINGS

In order to assist the understanding of this invention, reference will now be made to the appended drawings. The drawings are exemplary only, and should not be construed as limiting the invention.

FIGS. 1, 2, and 3 show the results for the effects of flowing the simulated residual liquid phase of the generator effluent on the permeability of core plugs on three sands.

FIGS. 4, 5, and 6 show the results for the effects of flowing the simulated vapor phase condensate on the permeability of core plugs on three sands.

DETAILED DESCRIPTION OF THE INVENTION

In its broadest aspect, the present invention involves inhibiting permeability damage of a hydrocarbon formation containing clay minerals. This is accomplished by injecting into the formation a wet steam having in its vapor phase: (a) enough ammonia to produce sufficient ammonium in the vapor phase condensate of the wet steam to inhibit permeability damage of the formation in the vicinity of the vapor phase, and (b) enough carbon dioxide to keep the pH of the vapor phase condensate of the wet steam between 7.5 and 10.5. Preferably, the wet steam also has enough potassium chloride to inhibit permeability damage of the formation in the vicinity of the residual liquid phase of the wet steam.

Control of pH and permeability damage in both the residual liquid phase and the vapor condensate regions can be done by adding three chemicals. Potassium chloride and anhydrous ammonia can be added to prevent permeability damage caused by classic clay problems, and carbon dioxide may be added to control the pH of the generator effluent to prevent damage caused by excessive rock dissolution. The potassium chloride can be added to the feedwater and the carbon dioxide and ammonia must be injected into the flowline downstream of the generator. Carbon dioxide should not be injected into the flowline upstream of the ammonia. It could be injected with the ammonia (as a mixture) or well downstream of the ammonia injection point to make sure the ammonia is thoroughly mixed with the steam before the carbon dioxide is added. This is to prevent local acidic conditions that could have very detrimental corrosive effects on steel plumbing, especially at steam temperatures.

Potassium chloride is commonly used in the oil field as an additive to drilling and completion fluids to prevent permeability damage in susceptible sands. The salt can be dissolved in water to make a concentrated solution that is mixed with feedwater by pumping the solution into the feedwater line upstream of the stream generator to maintain a predetermined concentration in the feedwater. The salt must be clean and free of undissolved solids. Potassium chloride is moderately priced and readily available from many oil field service companies.

Anhydrous ammonia is not ordinarily used in the oil field; but it is readily available at a very low price because it is used in agriculture as a nitrogen fertilizer. Ammonia is a gas at atmospheric pressure; but it is stored and transported as a pressurized liquid. It can be purchased from most large farm supply houses.

Carbon dioxide is an industrial gas that can be purchased as a pressurized liquid at a relatively low price. It is sometimes used in oil fields and can be purchased from some oil field service companies and from many gas supply houses.

An alternate method involves injecting into the formation a dry steam that has enough ammonia in the dry steam to produce sufficient ammonium in the steam condensate to inhibit permeability damage of the formation in the vicinity of the condensate, and enough carbon dioxide to keep the pH of the steam condensate between 7.5 and 10.5.

EXAMPLES

Our studies on permeability measuring methods showed large differences between brine and air permeabilities for smectitic Temblor sand cores from Coalinga. Permeability increased when those core plugs were air dried between measurements.

This increase in permeability resulted from changes in the clay mineral fabric during the drying process. When water evaporates from a clayey sand, the first water to vaporize is in the largest pores. As drying progresses, the air/water interfaces recede into smaller and smaller pores. Eventually, most of the remaining bulk water is in the clay matrix lining the pore walls. As the air/water interfaces recede into this fragile clay matrix, interfacial tension forces cause the clay particles to distort and move toward the pore walls. When completely dry, the clays are matted against the walls, causing increases in effective pore size and measured permeability.

When the core plugs are resaturated with brine, the permeabilities are somewhat lower than when completely dry. This is caused by an incomplete reversal of the matting process during rehydration of the clay surfaces. Most importantly, the brine permeability after drying is usually much higher than it was before drying. This residual effect of drying on permeability can be exploited to stimulate permeability in clayey reservoir sands.

To make this a viable field method, a practical method is needed to dry the formation rock in the near-well area. Such methods were discussed in U.S. Ser. No. 453,652, entitled "Improving Permeability of Fines-Containing Earthen Formations By Removing Liquid Water," filed Dec. 20, 1989, which is hereby fully incorporated for all purposes. Probably the most practical method is by steam injection and blowdown, i.e., heating the near-well formation by injecting steam and blowing down the steam, which causes the sand to dry. This method would be most attractive in the steam stimulation and injection regions (such as California's San Joaquin Valley) where steam generators or boilers are available. It would be especially attractive when combined with planned cyclic steam stimulation jobs, since the only added cost would be the cost of the blowdown step.

Initial laboratory work was based on air drying the rock in a convection oven. To test feasibility of the in situ field method (steam/blowdown), we developed a procedure for physically simulating (in our high temperature permeameter) the steps that would be used to carry out the method in the field. All results given below were obtained on core plugs using the high temperature permeameter simulating different field applications and conditions.

Preliminary results on core plugs from the Temblor sand showed that severe permeability damage occurred during injection of simulated steam generator effluent. That serious damage occurred while flowing cold (73° F.) generator effluent, and while flowing hot (450° F.) generator effluent. Thus, chemical additions to the steam would be needed to prevent permeability damage during steam injection. These chemical treatments were included in some of the laboratory physical simulation runs discussed below.

One-inch diameter plugs were taken from preserved cores using a plunge coring device. It was not possible to cut the plugs while frozen because of core composition and condition. The plugs were miscibly cleaned using the ACCUPERM method and liquid permeabilities were measured while flowing 1 N NaCl.

The plugs were installed in the high temperature permeameter at 1200 psi overburden and 800 psi pore pressure. A 1 N NaCl solution was flowed at 2 ml/min and at ambient laboratory temperature to establish the initial permeability under existing conditions. A simulated steam generator effluent was then flowed and the permeability was recorded until stable. While continuing to flow generator effluent at 2 ml/min, the temperature of the cell (including the influent solution) was raised to 450° F. as fast as practical. At 450° F., flow continued and the permeability was continuously monitored until stable. While maintaining 450° F. and flowing simulated generator effluent at 2 ml/min, the pore pressure in the core was lowered to 50 psi for 10 minutes then up to 800 psi by adjusting the back pressure regulator. Care was taken to maintain a maximum of 400 psi effective stress on the core during this blowdown phase. Soon after everything was relatively stable at the higher pore pressure, the high-temperature post stimulation permeability was recorded. The cell was then cooled to room temperature and the permeability was again measured to establish the final post treatment permeability.

The steam in a well at mature stages of injection has two phases, residual liquid and vapor. These phases are separated in the well with the formation at the very bottom of the hole receiving only liquid and the formation at the very top receiving only vapor. Some generator effluent components preferentially partition to the vapor phase and others to the liquid phase. Therefore, the chemical composition of the hot liquid in the formation at the bottom of the hole is quite different from the composition of the liquid in the vapor phase condensate region near the top of the well. Simulations were made of conditions in both regions by preparing simulated generator effluents based on partitioning of the feedwater components and the chemical additives to the proper phases.

Three sands were selected for study of the effects of the simulated residual liquid phase of the steam (bottom of hole) on permeability. Three matched plugs were selected from each sand. The first plug from each sand was used to simulate a permeability stimulation-by-drying method using steam blowdown, but without chemical additives. The second plug was used to simulate the addition of chemical additives to control the pH of the residual liquid phase of the steam, in addition to steam blowdown. Finally, the third plug was used to simulate stimulation with both permeability stimulation-by-drying method using steam blowdown, with chemical additives to control pH and to prevent permeability damage by clay dispersion.

Also studied were the effects of the simulated vapor phase condensate (in formation near the top of hole) on the three selected sands. Again, three matched plugs were selected from each sand and each was given a flow sequence to achieve the same objectives as described above, but here, we simulated the chemistry of the liquid existing in the vapor phase condensate region (top of hole).

Residual Liquid Phase Region (Bottom of Hole): Results for the effects of flowing the simulated residual liquid phase of the generator effluent on core plugs are shown in FIGS. 1, 2, and 3.

FIG. 1 shows results for the three plugs from the first sand. The first sequence (labeled "Untreated") shows the permeability of the plug after each step in the permeability stimulation-by-drying process, with no chemical addition. There was a large decrease in permeability during injection of cold generator effluent and a further decrease during flow of hot generator effluent. This means that generator effluent in conventional cyclic steam projects is very damaging to this sand even when cold and is worse when hot.

The blowdown step caused a very large increase in permeability, but not enough to make up for the damage from the injected fluids. The generator effluent was also severely damaging to the sand after the stimulation treatment. Thus, some treatment to prevent permeability damage in this sand is needed.

Formation damage partly results from rock dissolution and precipitation induced by the high temperature and high pH of the liquid phase of most steams. Not much can be done about the high temperature (one objective of steam treatment is to raise the temperature), but something can be done about the high pH. This high pH results from the decomposition of the bicarbonate in the feedwater, which causes the liquid phase to become very alkaline and the vapor phase condensate to become somewhat acidic. One way to neutralize the pH in both phases is to add ammonium salt to the feedwater, as shown in Watkins et al., cited above. The desired amount salt added is roughly equivalent to the concentration (in chemical equivalents) of bicarbonate in the feedwater.

The second sequence of permeability bars (labeled "pH Control") in FIG. 1 shows the permeability of the sand during the flow sequence when ammonium salts are used to control the pH. Note that there is still severe damage during the steam injection stages, but the damage is less than in the untreated case. The blowdown stage resulted in a higher permeability and more of the stimulated permeability was retained after flow of additional generator effluent. Obviously, there is still room for improvement in damage prevention.

The third flow sequence (labeled "Damage Control") in FIG. 1 shows the effect of providing both pH control and the addition of potassium chloride to the feedwater to prevent permeability damage by clay dispersion. In this case, relatively little permeability damage occurred during the initial steam injection steps and during flow after the blowdown stage. The blowdown step was very effective in stimulating permeability and the permeability was retained by the chemical additives during subsequent flow.

Very similar results were obtained for the other sands as shown in FIGS. 2 and 3. For some unknown reason, one plug with damage control chemicals showed only a two fold increase in permeability from the steam blowdown step; whereas, the plugs from the other two sands showed three to four fold increases. This may be a statistical artifact of single determinations.

Vapor Phase Condensate Region (Top of Hole): Results showing the effects of flowing simulated vapor phase condensate through the three sands are shown in FIGS. 4,5, and 6.

FIG. 4 shows results of flowing untreated simulated vapor phase condensate for each of the steps in the stimulation-by-drying process on a plug from the first sand. These results are very similar to those for the residual liquid phase. This liquid is damaging to a water sensitive rock because the condensate is essentially distilled water with a small amount of dissolved carbon dioxide. The data for the post blowdown permeability were lost, but the measured permeability after flowing cold generator effluent (vapor condensate) shows the blowdown step gave some permeability stimulation. Still, the remaining permeability is still much lower than before starting the steam injection. The same conclusions are drawn for the other sands, as shown in FIGS. 5 and 6. Chemical additives to prevent permeability damage by clay minerals during injection are as important in the vapor phase condensate region as in the residual liquid phase region.

There are fewer choices of chemical additives for the vapor phase condensate region, since it must be transported to that region through the vapor phase. Fortunately, ammonium ions are about as effective in preventing permeability damage as are potassium ions and ammonia is readily transported in the vapor phase. Anhydrous ammonia can be injected into the steam flow line downstream of the steam generator. The ammonia partitions largely to the vapor phase and is carried with the water vapor into the formation in the upper part of well. As the water vapor condenses, ammonia dissolves in the liquid water to form ammonium ions, which inhibit clay dispersion and structural expansion as permeability damage mechanisms.

An undesirable effect of the ammonia treatment is from the relatively high pH that it imparts to the condensate. Flowing aqueous solutions at steam temperature and high pH can dissolve large amounts of siliceous rock and thus cause permeability damage by another mechanism. The second flow sequence labeled "0.25 N $NH_3$" in FIGS. 5 and 6 shows the effects that adding ammonia to the generator effluent would have on permeabilities of the other sands in the vapor condensate region. In both cases, there is a definite decrease in permeability damage and an improvement in the total performance of the permeability stimulation treatment. This damage prevention treatment is effective when cold, but not at steam temperature. This is undoubtedly caused by rock dissolution and precipitation caused in part by the high pH from the added ammonia.

The third flow sequence labeled "$NH_3$ & $CO_2$" in FIG. 5 and 6 show the effects of adding ammonia and carbon dioxide to the flow line downstream of the steam generator. The results show the addition of carbon dioxide was very beneficial in decreasing the damage caused by flowing high temperature water, both before and after the blowdown step. The purpose of the added carbon dioxide is to neutralize the high pH generated by the added ammonia. Carbon dioxide also partitions largely to the vapor phase at steam temperatures and is transported with the water and ammonia vapor to the condensate region in the formation. As the water vapor condenses, carbon dioxide and ammonia dissolve in the liquid water and react to form ammonium and bicarbonate ions, which impart a neutral pH to the water.

While the present invention has been described with reference to specific embodiments, this application is intended to cover those various changes and substitutions that may be made by those skilled in the art without departing from the spirit and scope of the appended claims.

What is claimed is:

1. A method for injecting a wet steam into a hydrocarbon formation comprising:
   (a) adding potassium chloride to a feedwater;
   (b) generating wet steam from said feedwater containing said potassium chloride;
   (c) adding an amount of anhydrous ammonia into said wet steam sufficient to produce a concentration of ammonium ions in the vapor phase condensate of the wet steam effective to inhibit permeability damage of the formation in the vicinity of said vapor phase; and
   (d) adding an amount of carbon dioxide into said wet steam effective to keep the pH of the vapor phase condensate of the wet steam within the range of about 7.5 to about 10.5; and
   (e) injecting said carbon dioxide-containing wet steam into said formation.

2. A method for increasing the permeability of a portion of a fines-containing earthen formation comprising removing liquid water from said portion by:
   (a) injecting a wet steam into a well within said formation, wherein said wet steam comprises:
      (i) an amount of ammonia in the vapor phase of said wet steam sufficient to produce a concentration of ammonium ions in the vapor phase condensate of the wet steam effective to inhibit permeability damage of the formation in the vicinity of said vapor phase; and
      (ii) an amount of carbon dioxide in the vapor phase of said wet steam effective to keep the pH of the vapor phase condensate of the wet steam within the range of about 7.5 to about 10.5; and
   (b) abruptly lowering of the pressure on said steam to vaporize substantially all of said liquid water and to cause said vaporized water to leave said portion, thereby increasing the permeability of said portion of said formation.

3. A method according to claim 2 wherein said wet steam further comprises an amount of potassium chloride effective to inhibit permeability damage of the formation in the vicinity of the liquid phase of said wet steam.

4. A method for increasing the permeability of a portion of a fines-containing earthen formation comprising removing liquid water from said portion by:
   (a) adding potassium chloride to a feedwater;
   (b) generating wet steam from said feedwater containing said potassium chloride;
   (c) adding an amount of anhydrous ammonia into said wet steam sufficient to produce a concentration of ammonium ions in the vapor phase condensate of the wet steam effective to inhibit permeability damage of the formation in the vicinity of said vapor phase; and (d) adding an amount of carbon dioxide into said wet steam effective to keep the pH of the vapor phase condensate of the wet steam within the range of about 7.5 to about 10.5;

(e) injecting said carbon dioxide-containing wet steam into said formation; and (f) abruptly lowering of the pressure on said steam to vaporize substantially all of said liquid water and to cause said vaporized water to leave said portion, thereby increasing the permeability of said portion of said formation.

5. A method for injecting a wet steam into a hydrocarbon formation comprising:

(a) generating wet steam;

(b) adding an amount of anhydrous ammonia into said wet steam sufficient to produce a concentration of ammonium ions in the vapor phase condensate of the wet steam effective to inhibit permeability damage of the formation in the vicinity of said vapor phase; and (c) adding an amount of carbon dioxide into said wet steam effective to keep the pH of the vapor phase condensate of the wet steam within the range of about 7.5 to about 10.5; and (d) injecting said carbon dioxide-containing wet steam into said formation.

6. A method for injecting a dry steam into a hydrocarbon formation comprising:

(a) generating dry steam;

(b) adding an amount of anhydrous ammonia into said dry steam sufficient to produce a concentration of ammonium ions in the vapor phase condensate of the dry steam effective to inhibit permeability damage of the formation in the vicinity of said vapor phase; and (c) adding an amount of carbon dioxide into said dry steam effective to keep the pH of the vapor phase condensate of the dry steam within the range of about 7.5 to about 10.5; and (d) injecting said carbon dioxide-containing dry steam into said formation.

* * * * *